United States Patent Office 3,481,987
Patented Dec. 2, 1969

3,481,987
REMOVAL OF OXYGEN IMPURITY FROM CARBON MONOXIDE
Giovanni Biale, Placentia, Calif., assignor to Union Oil Company of California, Los Angeles, Calif., a corporation of California
No Drawing. Filed Aug. 14, 1967, Ser. No. 660,177
Int. Cl. C07c *45/10;* B01d *53/00*
U.S. Cl. 260—604                10 Claims

ABSTRACT OF THE DISCLOSURE

Removal of oxygen impurity from carbon monoxide by contacting the impure carbon monoxide with metallic copper, and use of the purified CO in hydroformylation reaction to prepare aldehydes and alcohols. Product alcohols find utility as solvents and plasticizers.

---

This invention relates to purification of carbon monoxide for use in hydroformylation of olefins to form aldehydes or alcohols. The conventional hydroformylation reaction ("Oxo" process) consists of heating the olefin with a mixture of carbon monoxide and hydrogen at between about 50° and 200° C. and at a pressure of about 50 to 400 atmospheres in the presence of a suitable catalyst.

Complex Group VIII noble metal catalysts, e.g., those described in U.S. Patents 3,239,566 and 3,239,571, have been found to be effective for hydroformylation. These catalysts generally comprise a carbonyl of a Group VIII metal such as cobalt, ruthenium, rhodium, rhenium, osmium, iridium and platinum. The activity of these catalysts is generally enhanced by the inclusion of a biphyllic ligand from the group consisting of phosphines, arsines and stibines or by inclusion of a polyheterocyclic amine, as disclosed in application Ser. No. 518,562, or by a combination of the two.

It has also been found, as disclosed in application Ser. No. 642,191 that the activity of a catalyst comprising a Group VIII noble metal carbonyl and a biphyllic ligand can be greatly enhanced if the catalyst is employed as a hydride, i.e., the catalyst comprises a complex between a biphyllic ligand and a Group VIII noble metal hydride carbonyl.

It has now been found that the presence of appreciable amounts of oxygen impurity in the carbon monoxide reactant has a decided poisoning effect on the catalyst, particularly where the catalyst includes a biphyllic ligand or is employed as a hydride, as in the above-mentioned patents and applications. In such cases it is essential to utilize carbon monoxide having a very low oxygen content, generally less than about 10 p.p.m. Since C.P. quality carbon monoxide may contain as much as 0.25% oxygen as impurity, it is essential to remove most of this oxygen before utilization of the carbon monoxide in the hydroformylation reaction.

It has now been found that this oxygen impurity may be very effectively removed by contacting the impure carbon monoxide with metallic copper at elevated temperature. Although the exact mechanism of the purification process of the invention is not known, it is believed to involve a catalytic oxidation of CO with the oxygen impurity.

The copper may be in any form that provides substantial surface area for contact with the impure carbon monoxide. It may, for example, be in granular, wire or ribbon form or supported on a carrier. Copper wire or ribbon has been found to be most convenient fo purification of carbon monoxide containing oxygen in amounts up to about 0.25%. Optimum size and amount of the wire will depend on the temperature employed, amount of gas to be purified, time of contact, etc. The wire may be employed in any convenient form, e.g., straight or coiled or in the form of a mat or gauze.

If the copper is employed in granular form, granules of from about 1 to 25 mesh are generally suitable. It may also be supported on a carrier such as $Al_2O_3$.

Optimum temperature will vary considerably depending on surface area of the copper, amount of carbon monoxide, percentage of oxygen impurity, etc., and is readily determined experimentally. When copper wire is used temperatures of from about 700 to 1200° F. have been found to give a very efficient removal of oxygen, i.e., to amounts as low as about 50 p.p.m. or less.

Although elemental copper is the active agent in purification of the carbon monoxide, a light coating of oxide or other easily reducible compound is not seriously deleterious since it is easily reduced to metallic copper as a result of contact with the carbon monoxide. Where such a coating is present it is usually desirable to employ a start-up temperature that is less, e.g., about 500° F. less, than the desired reaction temperature since the reaction involved in removing the oxide coating is highly exothermic. Alternatively, a substantially decreased flow rate of the impure CO, e.g., about 100 ml./min., may be used during initial removal of the oxide.

Contact of the impure CO with the copper is most conveniently effected by simply passing the impure gas over a bed of the copper. Optimum flow rate of the gas will vary widely with the form and amount of the copper, amount of $O_2$ in the impure gas and desired purity of product. Generally, flow rates of about 500 to 5000 ml./min. will give an efficient removal of oxygen.

The following examples will serve to more specifically illustrate the process of the invention and its advantage over prior art processes.

EXAMPLES 1 TO 9

In these examples a variety of catalytic materials that are known to remove oxygen impurity from hydrogen and other commonly used gases were tested for their ability to remove oxygen impurity from carbon monoxide. The apparatus employed was a "Vycor" tube, about one and one-half feet in length and one inch in diameter. Thirty ml. of the catalyst were placed in the tube to form a bed about six inches in length. The metallic copper was in the form of short pieces of wire about $\frac{1}{32}$ inch in diameter and ¼ inch long. The remaining catalytic materials were in the form of pellets ¼ inch in diameter. The tests were all run at atmospheric pressure using a flow rate of carbon monoxide of 1000 ml./min. for a period of about one hour. The impure carbon monoxide contained 1500 p.p.m. $O_2$. Compositions and temperatures of the catalysts and results, in terms of residual $O_2$ in the carbon monoxide, are given in Table I. The superiority of copper in removal of oxygen impurity is evident from these results.

TABLE I

| Catalyst | Temp., ° F. | Residual $O_2$, p.p.m. |
|---|---|---|
| Example: | | |
| 1 ------------------ 10% $Cr/Al_2O_3$ -------- | 900 | 800 |
| 2 ------------------ 0.6% $Pd/SiO_2$-$Al_2O_3$ --- | 900 | 100 |
| 3 ------------------ 10% $Cu/Al_2O_3$ -------- | 900 | 200 |
| 4 ------------------ 20% $Cu/Al_2O_3$ -------- | 900 | 100 |
| 5 ------------------ 0.6% $Pt/Al_2O_3$ -------- | 900 | 300 |
| 6 ------------------ 0.6% $Pt/Al_2O_3$ -------- | 470 | 1,000 |
| 7 ------------------ 40% $Cu/Al_2O_3$ -------- | 900 | 50 |
| 8 ------------------ Activated charcoal ---- | 900 | 300 |
| 9 ------------------ Cu (wire) ------------- | 900 | 25 |

I claim:
1. In the method of hydroformylation in which an olefin is reacted with hydrogen and carbon monoxide in the presence of a complex catalyst comprising a Group VIII metal, the improvement comprising purifying the carbon monoxide prior to reaction with the olefin by contacting the impure carbon monoxide with metallic copper for a time and at a temperature from about 700 to 1200° F., sufficient to remove a substantial proportion of oxygen impurity.

2. The method of claim 1 in which the catalyst comprises a Group VIII noble metal and a biphyllic ligand from the group consisting of phosphines, arsines and stibines.

3. The method of claim 2 in which the catalyst comprises a Group VIII noble metal hydride carbonyl.

4. The method of claim 1 in which the impure carbon monoxide contains oxygen in an amount less than about 0.25%.

5. The method of claim 1 in which the copper is in wire form.

6. The method of claim 1 in which the copper is on a carrier.

7. A method of purifying carbon monoxide containing a minor amount of oxygen as impurity comprising contacting the impure carbon monoxide with metallic copper for a time and at a temperature from about 700 to 1200° F., sufficient to remove a substantial proportion of oxygen impurity.

8. The method of claim 7 in which the oxygen impurity is present in the carbon monoxide in an amount less than about 0.25%.

9. The method of claim 7 in which the copper is in wire form.

10. The method of claim 7 in which the copper is on a carrier.

References Cited

UNITED STATES PATENTS

| | | | |
|---|---|---|---|
| 2,694,047 | 11/1954 | Glazier | 252—373 |
| 3,090,684 | 5/1963 | Nonnenmacher et al. | 252—373 XR |
| 3,097,081 | 7/1963 | Eastman et al. | 48—215 |
| 3,232,728 | 2/1966 | Reynolds | 48—215 |

FOREIGN PATENTS 1,070,603  12/1959  Germany.

OTHER REFERENCES

Hofman, Berichte, vol. 51 (1918), pp. 1334–1346.

BERNARD HELFIN, Primary Examiner

U.S. Cl. X.R.

23—2, 204; 260—632